United States Patent
Kadane et al.

(10) Patent No.: US 7,072,811 B2
(45) Date of Patent: Jul. 4, 2006

(54) METHOD AND SYSTEM FOR IDENTIFYING REGENERATION POINTS IN A MARKOV CHAIN MONTE CARLO SIMULATION

(75) Inventors: Joseph B. Kadane, Pittsburgh, PA (US); Anthony E. Brockwell, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 643 days.

(21) Appl. No.: 10/197,356

(22) Filed: Jul. 15, 2002

(65) Prior Publication Data
US 2004/0010399 A1    Jan. 15, 2004

(51) Int. Cl.
G06F 7/60    (2006.01)
G06F 17/10   (2006.01)

(52) U.S. Cl. .......................................................... 703/2
(58) Field of Classification Search ..................... 703/2
See application file for complete search history.

(56) References Cited

OTHER PUBLICATIONS

Brockwell et al.; "Practical regeneration for markov chain monte carlo simulation"; pp. 1-23; Aug. 2001; incorporated document, obtained from www.stat.cmu.edu/www/cmu-stats/tr/.* regenmcmc.cc; program listing incorporated by reference; Aug. 2001; pp. 1-14; obtained from http://lib.stat.cmu/general.*

Crane, M.A. et al., An Introduction to the Regenerative Method for Simulation Analysis, vol. 4 of Lecture Notes in Control and Information Sciences, Springer, 1977.

Mykland, P. et al., Regeneration in Markov chain samplers, Journal of the American Statistical Association, 90:233-241, 1995.

Ripley, B.D., Stochastic Simulation, Wiley, 1987, only pages ix-xi and 157-161.

* cited by examiner

*Primary Examiner*—Hugh Jones
(74) *Attorney, Agent, or Firm*—Edward L. Pencoske

(57) ABSTRACT

The method of the present invention is to modify an initial target distribution it π by combining it with a point mass concentrated on an "artificial atom" α which is outside the state-space X. A Markov chain may then be constructed using any known technique (for example, using the Metropolis-Hastings Algorithm) with the new target distribution. For this chain, the state α is Harris-recurrent (i.e. with probability one, it occurs infinitely many times). By the Markov property, the times at which the new chain hits α are regeneration times. To recover an ergodic chain with limiting distribution π, it is sufficient simply to delete every occurrence of the state α from the new chain. The points immediately after the (deleted) occurrences of the state α are then regeneration times in a Markov chain with limiting distribution π.

20 Claims, 3 Drawing Sheets

METHOD AND SYSTEM FOR IDENTIFYING REGENERATION POINTS IN A MARKOV CHAIN MONTE CARLO SIMULATION

STATEMENT REGARDING FEDERALLY FUNDED RESEARCH

The present invention was funded in part by the National Science Foundation under grant numbers DMS 9819950 and DMS 9801401. The Federal government may have rights in this invention.

BACKGROUND OF THE INVENTION

1. Field of the Invention

The present invention is directed generally to Markov chain Monte Carlo simulations and, more particularly, to a practical method of obtaining regeneration in a Markov chain.

2. Description of the Background

In statistics, answers to questions are often obtained by constructing statistical models of real-life situations and then analyzing the various probabilities of certain events occurring in the models. Such techniques can be used to determine the probability (based on collected data), for instance, that it will rain tomorrow, that a share price will exceed $20 with the next few months, or that there is racial bias in a company's hiring policies.

Of course, the validity of the analysis then relies quite heavily on the quality of the statistical model (i.e. on how well it approximates reality). In the past, statisticians have been inclined to "bend" reality to fit a specific group of models that they could work with. However, with the advent of Markov chain Monte Carlo (MCMC) methods, this is no longer necessary. MCMC methods allow statisticians to work with extremely complicated models. This means that statisticians can choose much more realistic models for analysis than they have previously.

There are some drawbacks, however. MCMC methods are computationally intensive, relying on simulation of large numbers of "possible outcomes." Furthermore, although the precision of answers to questions increases as the MCMC continues to generate simulations, it is difficult to compute this precision once the MCMC run is finished. Another drawback is the burn-in problem, that is, uncertainty about how long it takes before the chain is (by some measure) sufficiently close to its limiting distribution. Another drawback is the inherent correlation between successive elements of the chain. This correlation makes it difficult to estimate the variance of the Monte Carlo estimates.

Regeneration in MCMC is a tool which enables statisticians to avoid the burn-in problem and to determine relatively accurately the precision of estimates at the end of the MCMC run. Essentially, regeneration mitigates two of the major problems with MCMC methods. In addition, it provides a very convenient means of using parallel-processors to construct a single MCMC run. (In the past, people have used parallel processors to generate lots of short MCMC runs instead of one long one, but others have argued that one long run is better than multiple short runs.)

Early work on regenerative simulation can be found in M. A. Crane and D. L. Iglehart, Simulating Stable Stochastic Systems, I: General multi-server queues, *Journal of the Association of Computing Machinery*, 21:103–113, 1975, M. A. Crane and D. L. Iglehart, Simulating stable stochastic systems, II: Markov chains, *Journal of the Association of Computing Machinery*, 21:114–123, 1975 and M. A. Crane and A. J. Lemoine, *An Introduction to the Regenerative Method for Simulation Analysis*, volume 4 of *Lecture Notes in Control and Information Sciences*, Springer, 1977, while more recent discussion can be found in B. D. Ripley, *Stochastic Simulation*, Wiley, 1987 and P. Mykland, L. Tierney, and B. Yu, Regeneration in Markov chain samplers, *Journal of the American Statistical Association*, 90:233–241, 1995. Loosely speaking, a regenerative process "starts again" probabilistically at each of a set of random regeneration points, called regeneration points. Furthermore, conditioned on any regenerative point, the future of the process is independent of the past. (Probably the simplest example of a set of regeneration points is the set of hitting times of some arbitrary fixed state. However, this example is not very interesting for most continuous state-space chains, because the expected time between such regeneration points can be infinite.)

If regeneration points can be identified in the Markov chain, then tours of the chain between these times are (on an appropriate probability space) independent, identically distributed (i.i.d.) entities. Thus, if a fixed number of tours is generated, it makes no sense to discard any initial tours, or indeed, any part of the first tour, because properties of the "clipped" tour would be quite different from properties of the other un-clipped tours. In this sense, the problem of burn-in is avoided. In addition, because the tours are i.i.d, when estimating the expectation of an arbitrary function of a parameter, the variance of the estimator itself can be estimated. There are further benefits as well. In constructing a regenerative chain, it is not necessary for all the tours to be generated on a single processor, and it is therefore possible to use parallel processors to generate a single long chain with the desired target distribution.

Previous methods of using regeneration in MCMC simulation have been limited by the complexity of their implementation. Hence they are not used much in practice. Thus, the need exists for a method of identifying regeneration points that is practical and simple to implement.

SUMMARY OF THE PRESENT INVENTION

The method of the present invention is to modify an initial target distribution $\pi$ by combining it with a point mass concentrated on an "artificial atom" $\alpha$ which is outside the state-space X. A Markov chain may then be constructed using any known technique (for example, using the Metropolis-Hastings Algorithm) with the new target distribution. For this chain, the state $\alpha$ is Harris-recurrent (i.e. with probability one, it occurs infinitely many times). By the Markov property, the times at which the new chain hits $\alpha$ are regeneration times. To recover an ergodic chain with limiting distribution $\pi$, it is sufficient simply to delete every occurrence of the state $\alpha$ from the new chain. The points immediately after the (deleted) occurrences of the state $\alpha$ are then regeneration times in a Markov chain with limiting distribution $\pi$.

The method of the present invention avoids the burn-in problem. In addition, because the tours are i.i.d, when estimating the expectation of an arbitrary function of a parameter, the variance of the estimator itself can be estimated. In constructing a regenerative chain, it is not necessary for all the tours to be generated on a single processor, and it is therefore possible to use parallel processors to generate a single long chain in a parallel, or distributed, manner with the desired target distribution. Those advantages and benefits, and others, will be apparent from the Description of the Preferred Embodiments herein below.

BRIEF DESCRIPTION OF THE DRAWINGS

For the present invention to be easily understood and readily practiced, the present invention will now be described, for purposes of illustration and not limitation, in conjunction with the following figures, wherein.

DESCRIPTION OF THE PREFERRED EMBODIMENTS

Figure 3:
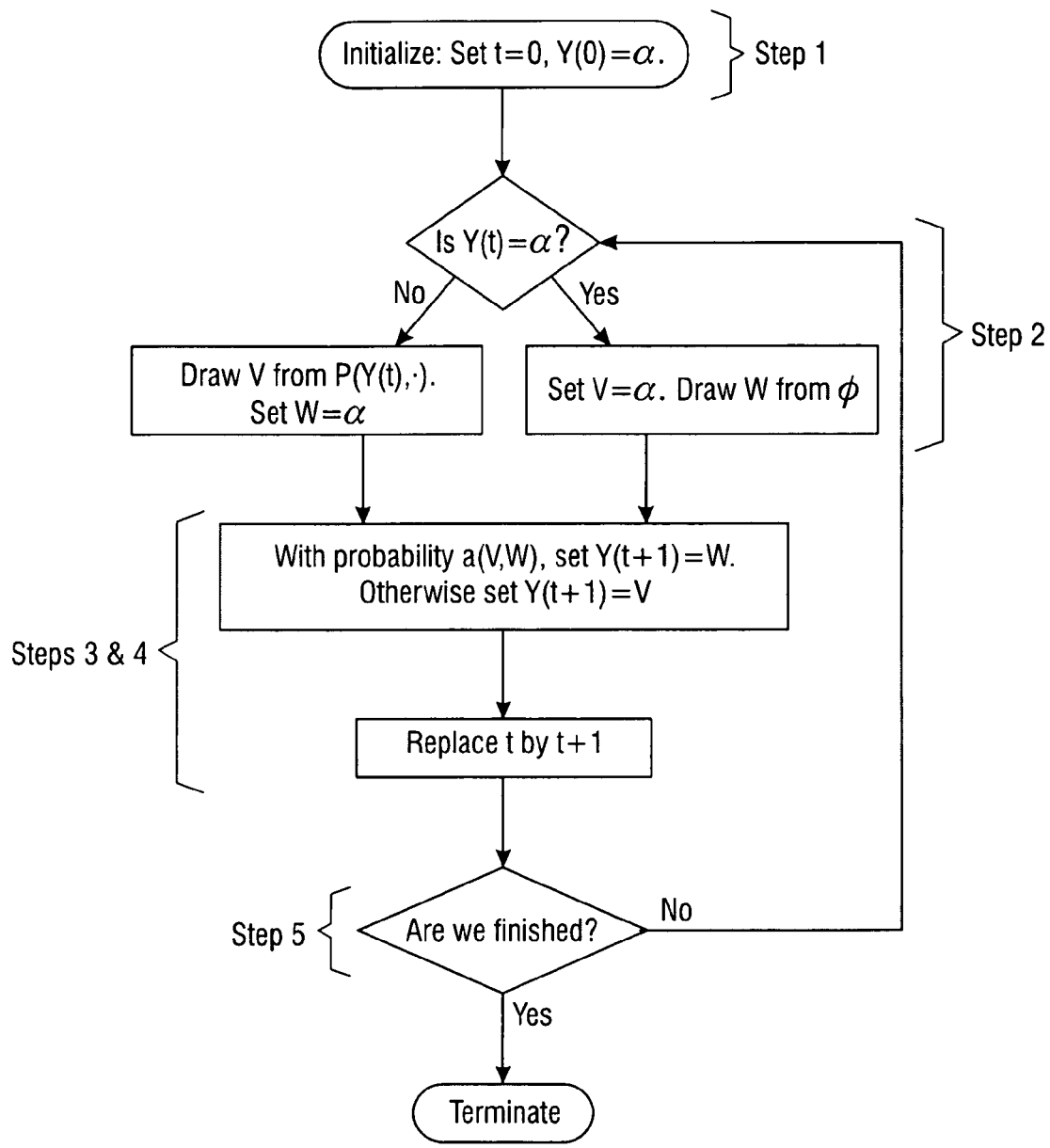
FIG. 3 is a flow chart illustrating a method for calculating $\{Y_t\}$.

This section provides a qualitative description of the method of FIG. 3 used to construct a regenerative Markov chain with a specified limiting distribution π. Formal statements and proofs of our results can be found in our paper "Practical Regeneration for Markov Chain Monte Carlo Simulation" dated Aug. 14, 2001 available at http://www-.stat.cmu.edu/www/cmu-stats/tr/ which is hereby incorporated by reference. The method is to enlarge the state-space from X to:

E=X∪α, where α is a new state called an artificial atom. Then it is possible (as described later) to construct a Markov chain $\{Y_t, t=0, 1, 2, \ldots\}$ with limiting distribution:

$$\pi^*_p(A) = (1-p)\pi(A\setminus\alpha) + pI_A(\alpha) \quad (1)$$

(defined on appropriate subsets A of E) instead of π, where p is some constant in the interval (0, 1). The new limiting distribution $\pi^*_p$ is a mixture distribution which assigns mass p to the new state α and mass (1−p) to the original distribution π. For reasons which will become apparent later, the initial state $Y_0$ is set equal to α. An example of the beginning of a realization of such a chain is shown in FIG. 1.

Next let $\tau_y(j)$ denote the jth time after time zero that the chain $\{Y_t\}$ hits the state α, with $\tau_y(0)=0$, so that $$\tau_y(j) = \min\{k > \tau_y(j-1): Y_k = \alpha\}, j=1, 2, 3, \ldots, \quad (2)$$

and define the tours $Y^1, Y^2, \ldots$ to be the segments of the chain between the hitting times, that is $$Y^j = \{Y_t, \tau_y(j-1) < t \leq \tau_y(j)\}, j=1, 2, \quad (3)$$

Figure 1:
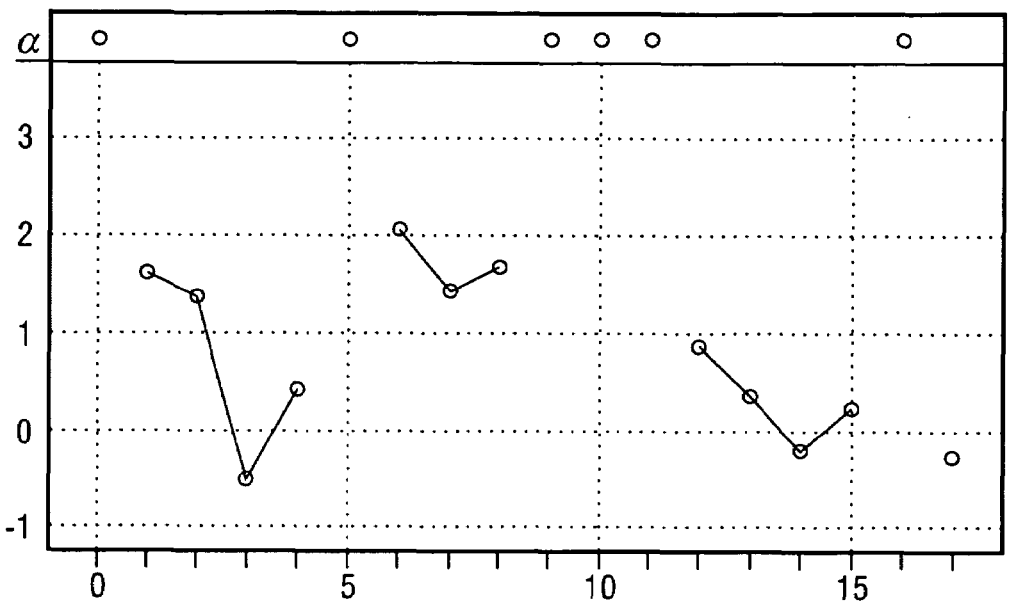
FIG. 1 illustrates the beginning of a realization of a Markov chain $\{Y_t\}$ taking values in E=X∪$\{\alpha\}$ and $Y_t=\alpha$ for t∈$\{0, 5, 9, 10, 11, 16\}$.

For example, the first five tours of the chain $\{Y_t\}$ shown in FIG. 1 are $Y^1=\{Y_1, Y_2, Y_3, Y_4, Y_5\}$, $Y^2=\{Y_6, Y_7, Y_8, Y_9\}$, $Y^3=\{Y_{10}\}$, $Y^4=\{Y_{11}\}$, and $Y^5=\{Y_{12}, Y_{13}, Y_{14}, Y_{15}, Y_{16}\}$.

The next step is to recover a regenerative chain with limiting distribution π. Define the chain $\{Z_t\}$ to be exactly the chain $\{Y_t\}$, with every occurrence of the state α removed. Noting that the state α occurs at the end of each tour $Y_j$, this means that $\{Z_t\}$ can be constructed by stringing together the tours $Y^j$ whose length is larger than one, after removing the last element (which is equal to α) from each one. Tours $Z^j$ of $\{Z_t\}$ are then defined by their correspondence to the truncated tours of $\{Y_t\}$. Let $T_j$ denote the time at which the (j+1)th tour of $\{Z_t\}$ begins, for j=0, 1, 2, ... (So $T_0$ is always equal to zero.)

Figure 2:
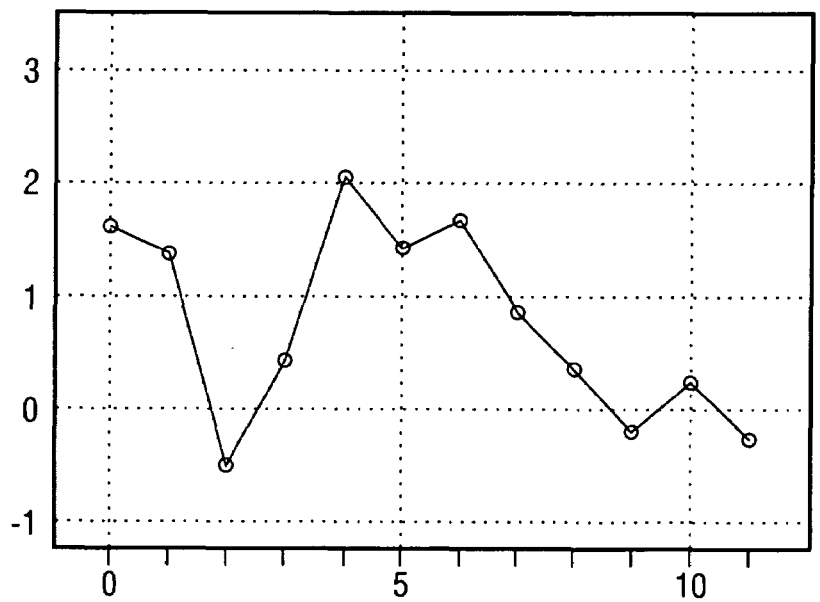
FIG. 2 illustrates the beginning of the chain $\{Z_t\}$ obtained from the chain $\{Y_t\}$ shown in FIG. 1 where the values for $Y_t=\alpha$ have been removed.

To illustrate this construction, FIG. 2 shows the first part of the sequence $\{Z_t\}$ corresponding to the (partial) chain $\{Y_t\}$ given in FIG. 1. In this case, the first three tours are $Z^1=\{Y_1, Y_2, Y_3, Y_4\}$, $Z^2=\{Y_6, Y_7, Y_8\}$), and $Z^3=\{Y_{12}, Y_{13}, Y_{14}, Y_{15},\}$, the elements of the Markov chain $\{Z_t\}$, are $Z_0=Y_1, Z_1=Y_2, Z_2=Y_3, Z_3=Y_4, Z_4=Y_6 \ldots$, and the times at which tours of $\{Z_t\}$ begin are $T_0=0, T_1=4, T_2=7, \ldots$ A formal description of the construction of $\{Z_t\}$ is given in our paper, where we also prove that a chain $\{Z_t\}$ constructed in this manner is an ergodic Markov chain with limiting distribution π, and that the times $T_0, T_1, \ldots$ are regeneration points for the chain.

Often one is interested primarily in estimating $$h_\pi = \int_{\mathbb{R}^d} h(x) d\pi(x)$$

for some function h (·). (Assume that $h_\pi$ exists.) Let tours $Z_j$, tour lengths $N_j$, and cumulative tour lengths $T_j$ of the Markov chain $\{Z_t\}$ with limiting distribution π be as defined above. Also let $$h_j = \sum_{t=T_{j-1}}^{T_j - 1} h(Z_t). \quad (4)$$

Then Crane and Lemoine (1977), supra, suggest using the ratio estimator $$\hat{h}_n = \frac{\sum_{j=1}^{n} h_j}{T_n}, \quad (5)$$

which converges almost surely to $h_\pi$. Furthermore, since the $h_j$s and the $N_j$s are i.i.d., if they have finite variances, then $$\sqrt{n}(\hat{h}_n - h_\pi)$$

converges to a N(0, $\sigma^2$) distribution. Ripley (1987), supra, and Mykland et al. (1995), supra, propose using $$\hat{\sigma}^2 = \frac{n\sum_{j=1}^{n}(h_j - \hat{h}_n N_j)^2}{T_n^2} \quad (6)$$

as an estimator of $\sigma^{-2}$, but only when the coefficient of variation $c_n$ of $T_n/n$ is sufficiently small (Mykland et al., 1995), supra, suggest that the estimator should not be used if the coefficient is larger than 0.01.) The coefficient of variation $c_n$ depends on the distribution of the tour lengths $N_j$, which is usually not known. However, it may be estimated by $$\hat{c}_n = \sum_{j=1}^{n} (N_j/T_n - 1/n)^2, \quad (7)$$

and since $c_n$ is proportional to $n^{-1}$, it is possible, based on an estimate $\hat{c}_{n1}$, to guess how many additional tours $n_2$ would be required to ensure that $\hat{c}_{n1+n2}$ would be less than (say) 0.01.

Finally, it is worth noting that there are many alternatives to the estimator (5) of h$\pi$. We do not discuss them here, as the method given above is sufficient for our purposes. Instead the reader is referred to Section 7 of Crane and Lemoine (1977), supra, for more details.

The present invention constructs a regenerative chain $\{Z_t\}$, relying on the construction of a chain $\{Y_t\}$ with $Y_0=\alpha$ and limiting distribution $\pi^*_p$. We next present a simple way, given an existing method for generating a chain with limiting distribution $\pi$, of constructing a chain with limiting distribution $\pi^*_p$.

Let the probability of density of $\pi$ be $\beta f(\cdot)$, where $\beta$ is an unknown constant, and suppose that the transition kernel P($\cdot,\cdot$) of a "reasonably good" (i.e. well-mixing) Markov chain taking values in X with limiting distribution $\pi$, is already known. Let $\phi(\cdot)$ denote the probability density of some "re-entry" distribution, satisfying the property that $\phi(x)>0 \Leftrightarrow f(x)>0$, and let p* be some positive constant. Then the algorithm shown in FIG. 3 can be used to construct a Markov chain $\{Y_t\}$ taking values in E, with $Y_0=\alpha$ and limiting distribution $\pi^*_p$, where $p=\beta p^*(1+\beta p^*)^{-1}$.

Algorithm 1: (See FIG. 3)

Step 1. Set $Y_0=\alpha$. Set t=0.

Step 2. Is $Y_t=\alpha$? If yes, set V=$\alpha$. If no, chose V$\in$X by applying the transition kernel P($\cdot,\cdot$) to $Y_t$.

Step 3. Choose a proposal point W$\in$E as follows. If $Y_t\in$X, then set W=$\alpha$. Otherwise choose W$\in X^d$ by sampling from the re-entry density $\phi$.

Step 4. Compute $$a(V, W) = \begin{cases} \min\left(1, \dfrac{p*\phi(V)}{f(V)}\right), & W = \alpha \\ \min\left(1, \dfrac{f(W)}{p*\phi(W)}\right), & W \in X \end{cases}$$

With probability $\alpha$(V, W), set $Y_{t+1}$=W. Otherwise leave $Y_{t+1}=V$.

Step 5. t$\leftarrow$t+1. Go back to Step 2 unless some end criterion is satisfied.

Algorithm 1 can be thought of as a hybrid algorithm, which alternates between applying two different probability kernels. The first, applied in Step 2, is a simple extension of a standard kernel for sampling from $\pi$. Step 2 is trivial if $Y_t=\alpha$. Otherwise, it involves the application of a standard $\pi$-invariant MCMC kernel, such as a Metropolis-Hastings or Gibbs kernel to generate $Y_{t+1}$ from $Y_t$. (For a multi-component Metropolis-Hastings sampler or a Gibbs sampler, the kernel represents a complete cycle of component updates.) This extension has invariant distribution $\pi^*_p$, with $p=\beta p^*(1+\beta p^*)^{-1}$, but does not allow the chain to move back and forth between $\alpha$ and X. The second kernel, applied in Steps 3 and 4, also has invariant distribution $\pi^*_p$, but allows movement between $\alpha$ and X. In our paper, supra, Appendix A, we prove that the chain $\{Y_t\}$ generated by Algorithm 1 is ergodic with limiting distribution $\pi^*_p$.

Choice of the parameter p* and the re-entry distribution $\phi$ is important. Because Algorithm 2, below, discards tours of length one (which consist only of the state $\alpha$), it is computationally inefficient to generate a chain with a large number of successive occurrences of the state $\alpha$. Therefore it is desirable to have high acceptance probabilities for jumps from $\alpha$ back into X. This can be achieved by choosing small values of p* relative to "typical" values of $\phi(y)/f(y)$. On the other hand, choosing p* in this manner leads to small probabilities of accepting jumps from X to $\alpha$, which in turn leads to long tour lengths. If the tour lengths become too long, then Algorithm 2 can take a long time to finish.

The re-entry distribution $\phi$ should be equivalent to the original target distribution $\pi$. That is, $\phi$ should assign positive mass to a set if and only if $\pi$ does as well. Typically, $\phi$ is chosen by constructing a crude approximation of some sort to the target density $\pi$.

Algorithm 1 is particularly useful because it provides a simple means of "wrapping up" an existing MCMC algorithm for sampling from $\pi$ to yield a Markov chain with limiting distribution $\pi^*_p$. However, Algorithm 1 does not necessarily improve mixing of the underlying kernel P ($\cdot,\cdot$) used in Step 2. If the underlying kernel mixes badly, then the resulting chain $\{Y_t\}$ is also likely to mix badly. Of course, Algorithm 1 is not the only way to construct a chain $\{Y_t\}$ with limiting distribution $\pi^*_p$. Another approach to constructing such a chain is simply to find the densities of $\pi^*_p$ and the proposal distribution with respect to a measure defined on appropriate subsets of the enlarged state-space E, and apply the standard Metropolis-Hastings Algorithm. While that approach may be more direct, it cannot be implemented by constructing a wrapper for a pre-established Markov transition kernel with limiting distribution$\pi$.

FIG. 3 provides a method of generating a Markov chain $\{Y_t\}$ with $Y_0=\alpha$ and limiting distribution $\pi^*_p$. Let Q($\cdot,\cdot$) denote the transition probability kernel of this chain. The next step is to use this chain to estimate the expectation (with respect to the probability measure $\pi$) of a "function of interest" h($\cdot$). Given a desired number of tours M>0, the following algorithm builds on the algorithm of FIG. 3 and uses our method to construct an estimate $\hat{h}_M$ itself.

Algorithm 2

Step 1. Initialization: Set $Y_0=\alpha$, m=0, t=0, $T_0$=0.

Step 2. Generate $Y_{t+1}$ given $Y_t$ by sampling from Q($Y_t,\cdot$). Replace t by t+1.

Step 3. Is $Y_{t+1}=\alpha$? If so, go back to Step 2.

Step 4. Set n=1. Set x=h($Y_{t+1}$).

Step 5. Generate $Y_{t+1}$ given $Y_t$ by sampling from Q($Y_t,\cdot$). Replace t by t+1.

Step 6. Is $Y_{t+1}=\alpha$? If so, go to Step 8.

Step 7. Replace x by x+h($Y_{t+1}$). Replace n by n+1. Go back to Step 5.

Step 8. Replace m by m+1. Set $h_m$=x, $N_m$=n and $T_m=T_{m-1}+N_m$.

Step 9. Is m<M? If so, go back to Step 2. Otherwise compute the desired estimate and its estimated variance using equations (5) and (6), respectively.

In Steps 2 and 5, it is necessary to generate iterations of a Markov chain with limiting distribution $\pi^*_p$. Algorithm 1 provides one method of doing that. Intuitively, Algorithm 2 works as follows. It repeatedly generates tours of a Markov chain $\{Y_t\}$ with limiting distribution $\pi^*_p$. Tours of length one (that is, tours which consist only of the state $\alpha$) are thrown out. Remaining tours are truncated just before they hit $\alpha$ so as to become tours of a chain $\{Z_t\}$ with limiting distribution π. The sum over each tour of the function of interest, evaluated at the chain's state, is recorded, as is the length of the tour. Once a total of M tours have been generated, the algorithm terminates, and equations (5) and (6) can be used to obtain the desired estimates.

Stopping Algorithm 2 at a fixed time and discarding the last incomplete tour would not be a valid approach as that would introduce bias because the discarded tour is more likely to be a long tour than a short tour, and different length tours typically have different probabilistic properties.

As mentioned previously, regeneration also provides a convenient means of using parallel processing for MCMC simulation. A detailed parallel processing version of Algorithm 2 is given in Appendix B of our paper.

Before using the variance estimate computed in Step 9 of Algorithm 2, the estimate $\hat{c}_M$ (compare equation (7)) of the coefficient of variation should be checked. The variance estimate should not be considered reliable if $\hat{c}_m$ is too large. Furthermore, it is important to keep in mind that even though Algorithm 2 side-steps the burn-in problem in the sense that there is no point in removing any initial portion of the chain, convergence of estimates $\hat{h}_n$ is still an issue. Consider, for instance, the following example. Suppose that a fair coin toss is being simulated, so that E can be regarded as $\{H, T, \alpha\}$, and that a chain $\{Y_t\}$ is constructed using Algorithm 1, with P(H, H) and P(T, T) close to one, and re-entry distribution $\phi(H)=1-\phi(T)=\zeta$. If $\zeta$ is small, then using Algorithm 2, one is likely to observe many length-one tours which consist of the state T, with an occasional long tour consisting mostly of the state H. In this case, if not enough tours are generated, it would be easy to observe only the state T and conclude that the coin never comes up heads. This example also illustrates the dangers of attempting to improve estimates by removing, say, the first few elements of each tour.

Examples demonstrating the performance of Algorithm 2 are found in our paper, supra.

Regeneration provides a convenient means of using parallel processing for MCMC simulation. A parallel processing version of Algorithm 2 is now provided.

Figure 4:
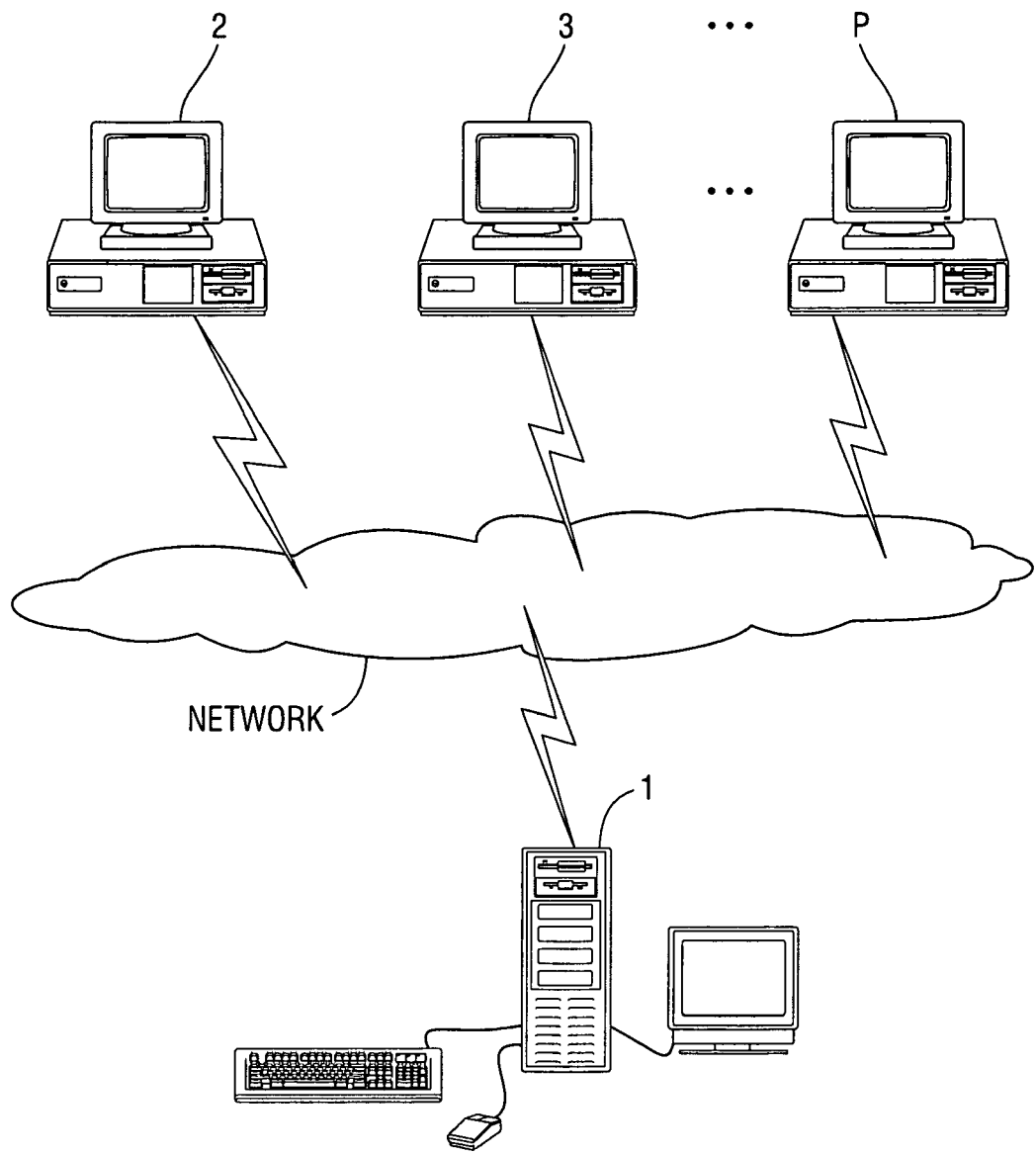
FIG. 4 illustrates a network in which the method of the present invention may be carried out.

Let $\{Z_t\}$ be the Markov chain constructed as described above. The tours $\{Z^j, j=1, 2, \ldots\}$ of $\{Z_t\}$ are independent of each other. Thus there is no need for them to be generated on a single processor. Suppose there are J processors available as shown in FIG. 4, and that they can construct realizations of tours independently. Now imagine that the first processor constructs some number $n_1$ of tours, the second processor constructs $n_2$ tours, and so on. If the tours generated on the processors are collected together and concatenated (in some order which is chosen independently of the tours themselves), then the resulting sequence is a realization of a single Markov chain with limiting distribution π, with a total of $$\sum_{j=1}^{J} n_j$$

tours.

In light of these observations, we can state the following parallel or distributed processing version of Algorithm 2. Let a first processor, the server 1 in FIG. 4, be designated as the "master processor" and all other processors 2 through P be designated as "slaves". The transition kernel P(x, A) is assumed to be the transition kernel for a Markov chain taking values in E with limiting distribution $\pi^*_p$.

Algorithm 3: Master Process

Step 1. Send requests for pairs $(h_1, N_1), \ldots, (h_{-1}, N_{-1})$ to slave processes 2 to J, respectively. Set k=F. Set n=0. Mark all slave processes as "busy".

Step 2. Wait for any slave to return its pair. Replace n by n+1 and mark the slave as "free".

Step 3. If n=M, then go to Step 6.

Step 4. If k≦M, send a new request to the freed slave to return the pair $(h_k, N_k)$, mark the slave as busy again, and replace k by k+1.

Step 5. Go back to Step 2.

Step 6. Terminate all the slave processes. Compute $\hat{h}_M$ and its estimated variance $\hat{\sigma}^2=/M$ using equations (5) and (6), respectively.

Algorithm 4: Slave Process

Step 1. Wait for a request from the master process for a pair $(h_j, N_j)$.

Step 2. Generate a portion $\{Y_t\}$ of a Markov chain with transition kernel P(·,·), starting with $Y_0=\alpha$. Run the chain until it hits a again and let this (second) hitting time be denoted τ.

Step 3. If τ=1, then discard the values $\{Y_0, Y_1\}$ and go back to Step 2.

Step 4. Compute $$h_j = \sum_{k=1}^{\tau-1} h(Y_k) \text{ and } N_j = \tau - 1.$$

Return the pair $(h_j, N_j)$ to the master process and go back to Step 1.

Note that it is desirable that random number generators on separate processors generate independent sequences of random variables. That is an easy rule to violate, because it is often the case that a process replicated on several machines will use the same pseudo-random number generator with the same seed. A simple (although not ideal) solution is to use a different seed for the generator on each separate processor.

Details on writing code for use with a regenerative MCMC simulation library available at Carnegie Mellon University are found in "Instructions for Using the Regenerative MCMC Simulation Library" by Anthony Brockwell, dated Mar. 26, 2002 and available at http://lib.stat.cmu.edu/general which is hereby incorporated by reference.

While the present invention has been described in connection with preferred embodiments thereof, those of ordinary skill in the art will recognize that many modifications and variations are possible. The present invention is intended to be limited only by the following claims and not by the foregoing description which is intended to set forth the presently preferred embodiment.

What is claimed is:

1. A method of generating a sequence of random numbers using a computer, comprising:
   inputting a group of parameters and a range of values for each parameter, said group of parameters and range of values defining an initial state space;
   generating an enlarged state space by combining said initial state space with an artificial value; and
   producing a Markov chain for said enlarged state space, wherein occurrences of said artificial value are excluded from the chain.

2. The method of claim 1 wherein said producing a Markov chain includes generating a first Markov chain for the enlarged state space and generating a second Markov chain for the original state space by removing occurrences of the artificial value from the first Markov chain.

3. The method of claim 2 wherein said generating a first Markov chain includes generating a plurality of first Markov chains in a distributed manner on a plurality of computers and wherein said generating a second Markov chain includes generating a plurality of second Markov chains.

4. The method of claim 3 additionally comprising combining said plurality of second Markov chains.

5. The method of claim 3 wherein said generating a plurality of first Markov chains additionally comprises setting each computers' random number seed differently.

6. A method of generating a sequence of random numbers using a computer, comprising:
inputting a group of parameters and a range of values for each parameter, said group of parameters and range of values defining an initial state space;
generating an enlarged state space by combining said initial state space with an artificial point to produce an enlarged state space;
generating a Markov chain for the enlarged state space; and
discarding occurrences of said artificial point from the Markov chain.

7. The method of claim 6 wherein said generating a Markov chain includes generating a plurality of first Markov chains in a distributed manner on a plurality of computers, and wherein said discarding occurrences of said artificial point from each of said plurality of first Markov chains produces a plurality of second Markov chains.

8. The method of claim 7 additionally comprising combining said plurality of second Markov chains.

9. The method of claim 7 wherein said generating a plurality of first Markov chains additionally comprises setting each computers' random number seed differently.

10. A method of generating a sequence of random numbers in a distributed manner with a plurality of interconnected computers, said method comprising:
setting a random number seed on each of a plurality of computers differently;
inputting a group of parameters and a range of values for each parameter into each computer, said group of parameters and range of values defining an initial state space;
generating an enlarged state space by combining said initial state space with an artificial value;
generating a plurality of first Markov chains for the enlarged state space with said plurality of computers;
removing occurrences of the artificial value from the first plurality of Markov chains to generate a plurality of second Markov chains; and
combining said plurality of second Markov chains.

11. The method of claim 10 wherein said removing of occurrences is performed by each of said plurality of computers.

12. The method of claim 11 wherein said combining is performed by a computer designated as a master computer.

13. The method of claim 10 wherein said removing of occurrences is performed by a computer designated as a master computer.

14. The method of claim 13 wherein said combining is performed by the master computer.

15. A memory device carrying a set of instructions which, when executed, performs a method on a computer comprising:
receiving a group of parameters and a range of values for each parameter, said group of parameters and range of values defining an initial state space;
generating an enlarged state space by combining said initial state space with an artificial value;
generating a plurality of first Markov chains for the enlarged state space with a plurality of computers;
removing occurrences of the artificial value from the first plurality of Markov chains to generate a plurality of second Markov chains; and
combining said plurality of second Markov chains.

16. The memory of claim 15 wherein said instructions enable said removing of occurrences to be performed by each of said plurality of computers.

17. The memory of claim 16 wherein said instructions enable a computer designated as a master computer to perform said combining.

18. The memory of claim 15 wherein said instructions enable said removing of occurrences to be performed by a computer designated as a master computer.

19. The memory of claim 18 wherein said instructions enable said combining to be performed by the master computer.

20. The memory of claim 15 wherein said instructions enable a random number seed on each of said plurality of computers to be set uniquely.

* * * * *

UNITED STATES PATENT AND TRADEMARK OFFICE
CERTIFICATE OF CORRECTION

| | | |
|---|---|---|
| PATENT NO. | : 7,072,811 B2 | Page 1 of 1 |
| APPLICATION NO. | : 10/197356 | |
| DATED | : July 4, 2006 | |
| INVENTOR(S) | : Joseph B. Kadane et al. | |

It is certified that error appears in the above-identified patent and that said Letters Patent is hereby corrected as shown below:

On The Title Page Item -57- "ABSTRACT", Line 2, delete the first occurrence of "it".

Column 3, Line 54, insert --...-- after the formula.

Column 4, Line 7, delete ")".

Column 4, Line 25, cancel "$Z_j$" and insert therefor --$Z^j$--.

Column 4, Line 49, delete the first occurrence of "$\sqrt{}$" the formula.

Column 4, Line 64, delete ")".

Column 5, Line 50, cancel "=$v$" and insert therefor --=V--.

Column 6, Line 10, cancel "/f" and insert therefor --/$f$--.

Column 6, Line 35, cancel "distributionπ" and insert therefor --distribution π--.

Column 8, Line 22, cancel "a" and insert therefor --α--.

Column 8, Line 47, cancel "Mar." and insert therefor --March--.

Signed and Sealed this

Nineteenth Day of June, 2007

JON W. DUDAS
*Director of the United States Patent and Trademark Office*